(12) United States Patent
Lerer et al.

(10) Patent No.: US 12,468,579 B2
(45) Date of Patent: Nov. 11, 2025

(54) SYSTEM AND METHODS FOR SERVER POWER MANAGEMENT

(71) Applicant: Zuta-Core Ltd., Hof Ashkelon (IL)

(72) Inventors: Abraham Lerer, Kfar Chabad (IL); Shahar Belkin, Kibutz Bror Hayil (IL)

(73) Assignee: ZUTA-CORE LTD., Hof Ashkelon (IL)

( * ) Notice: Subject to any disclaimer, the term of this patent is extended or adjusted under 35 U.S.C. 154(b) by 259 days.

(21) Appl. No.: 17/996,539

(22) PCT Filed: Apr. 19, 2021

(86) PCT No.: PCT/IL2021/050439
§ 371 (c)(1),
(2) Date: Oct. 19, 2022

(87) PCT Pub. No.: WO2021/214752
PCT Pub. Date: Oct. 28, 2021

(65) Prior Publication Data
US 2023/0229216 A1   Jul. 20, 2023

Related U.S. Application Data

(60) Provisional application No. 63/012,503, filed on Apr. 20, 2020.

(51) Int. Cl.
*G06F 9/50* (2006.01)

(52) U.S. Cl.
CPC .................................. *G06F 9/5094* (2013.01)

(58) Field of Classification Search
CPC .. G06F 9/5094; G06F 11/3062; G06F 1/3209; G06F 1/324
See application file for complete search history.

(56) References Cited

U.S. PATENT DOCUMENTS

| | | | |
|---|---|---|---|
| 9,501,115 B2 | 11/2016 | Mandagere et al. | |
| 11,681,353 B1 * | 6/2023 | Bower, III | G06F 1/3287 713/320 |
| 2007/0245161 A1 | 10/2007 | Shaw et al. | |
| 2010/0037077 A1 | 2/2010 | Kashyap | |
| 2012/0072745 A1 * | 3/2012 | Ahluwalia | G06F 1/26 713/340 |
| 2013/0261826 A1 * | 10/2013 | Mandagere | G06F 1/329 700/291 |

(Continued)

*Primary Examiner* — Hyun Soo Kim
(74) *Attorney, Agent, or Firm* — FISHERBROYLES, LLP; Roger L. Browdy; James E. Mrose

(57) ABSTRACT

A system and methods are provided for improving power efficiency of a data center, including: acquiring training data including power caps, utilization rates, and a measure of Service Level Agreement (SLA) compliance of one or more computer servers of the data center; creating a model for determining power caps according to measured utilization rates of the one or more computer servers, wherein the determined power caps, when applied to the one or more computer servers, reduce power consumption and meet the measure of SLA compliance; and applying the model, according to subsequent data received during a second operating period, to determine a power cap to apply to the one or more computer servers, wherein the subsequent data includes a subsequent utilization rate of the one or more computer servers.

16 Claims, 2 Drawing Sheets

(56) References Cited

U.S. PATENT DOCUMENTS

| | | |
|---|---|---|
| 2018/0052431 A1 | 2/2018 | Shaikh et al. |
| 2018/0074560 A1 | 3/2018 | Matteson et al. |
| 2018/0101214 A1* | 4/2018 | Mahindru .............. G06F 9/5094 |
| 2020/0104189 A1* | 4/2020 | Gopalan ................ G06F 9/5088 |
| 2020/0409748 A1* | 12/2020 | Bernat .................. G06F 9/5088 |

* cited by examiner

SYSTEM AND METHODS FOR SERVER POWER MANAGEMENT

FIELD OF THE INVENTION

The present invention relates to the field of computer power efficiency.

BACKGROUND

Costs of energy are a key driver in operational efficiency of data centers. The world's data centers consume terawatts of power, with each watt spent on processing typically requiring an additional watt of cooling capacity which also increases equipment and operational costs.

Cloud computers services which dominate many of the data centers guarantee their customers a predefined quality of service (QoS), typically defined formally by a Service Level Agreement (SLA). Failure to meet guaranteed SLA metrics for QoS exposes a data center to financial penalties. Data centers must also meet QoS standards in order to maintain customer satisfaction and to avoid customer churn and revenue lose. Lowering system performance to achieve energy savings is acceptable as long as the SLAs and expected levels of QoS are achieved.

Datacenter workloads have a high dynamic range of activity. The capacity of the datacenter is typically determined by the worst case (i.e., highest level) of expected demand. Unutilized systems can be put into various idle states which draw various levels of power. Deep idle states conserve more energy but require longer time to restore, as well as typically requiring a cost of higher activation energy. Therefore, systems are put in deep idle states only if they are expected to remain in this state for an extended period.

Server processor efficiency, i.e., the number of computations per watt is typically inversely related to processing speed (expressed in GHz). That is, in order to increase the frequency of a system, the voltage must typically be increased. Moreover, the voltage required by a circuit may increase with the square of the frequency. Running server CPUs at a lower clock speed typically increases efficiency (more instructions per watt) but reduces response time and may violate SLAs.

Data centers typically need to cope with requests for processing coming from outside the data center, i.e., North-South traffic, as well as traffic between the servers inside the data center, i.e., East-West traffic. For example, a search on a social network may trigger a request received by one server, which in turn may generate a cascade of requests to other servers which store information regarding the target information. Consequently, each external request typically causes a burst of internal traffic, which in turn increases power consumption. As traffic continues to increase, systems and methods are needed to improve power efficiency of data centers.

SUMMARY

Embodiments of the present invention provide a system and methods for improving power efficiency of a data center. One embodiment of the present invention is a system having one or more processors and a memory, the memory comprising instructions that when executed by the one or more processor cause the processor to implement steps of: acquiring, during a first operating period, training data including power caps, utilization rates, and a measure of Service Level Agreement (SLA) compliance of one or more computer servers of the data center; applying predictive analytics to the training data to create a model for determining power caps according to measured utilization rates of the one or more computer servers, wherein the determined power caps, when applied to the one or more computer servers, reduce power consumption and meet the measure of SLA compliance; and applying the model, according to subsequent data received during a second operating period, to determine a power cap to apply to the one or more computer servers, wherein the subsequent data includes a subsequent utilization rate of the one or more computer servers.

In some embodiments, applying the power cap includes setting a maximum CPU frequency or setting a maximum CPU voltage. Determining the power cap may include setting a higher power cap if an upper utilization threshold is reached, and setting a lower power cap if a lower utilization threshold is reached. A power cap step size for increasing or decreasing the power cap may be a function of a cooling system reaction capacity. The power cap step size for increasing or decreasing the power cap may be a function of a volatility of utilization levels during one or both of the first operating period and the second operating period.

In further embodiments the model may be a machine learning model.

In additional embodiments, he training data and the subsequent data may include: rotations per minute (RPM) of one or more fans of the one or more computer servers; and/or temperatures of one or more components of the one or more computer servers.

Embodiments of the present invention also include a method for improving power efficiency of a data center, the method implemented on one or more processors and a memory, the memory comprising instructions that when executed by the one or more processor cause the processor to implement the method, which may include: acquiring, during a first operating period, training data including power consumption and percent of full capacity utilization of one or more computer servers of the data center; applying predictive analytics to create a model for generating, from subsequent data including power consumption and percent of full capacity utilization, an optimal value of an operating parameter of the one or more computer servers; acquiring, during a second operating period, new data indicating power consumption and percent of full capacity utilization of the one or more computer servers; and responsively generating, with the model, the optimal value of the operating parameter of the one or more computer servers and sending a command to the one or more computer servers to set the operating parameter to the optimal value.

BRIEF DESCRIPTION OF DRAWINGS

For a better understanding of various embodiments of the invention and to show how the same may be carried into effect, reference will now be made, by way of example, to the accompanying drawings. Structural details of the invention are shown to provide a fundamental understanding of the invention, the description, taken with the drawings, making apparent to those skilled in the art how the several forms of the invention may be embodied in practice. In the figures.

DETAILED DESCRIPTION

Figure 1:
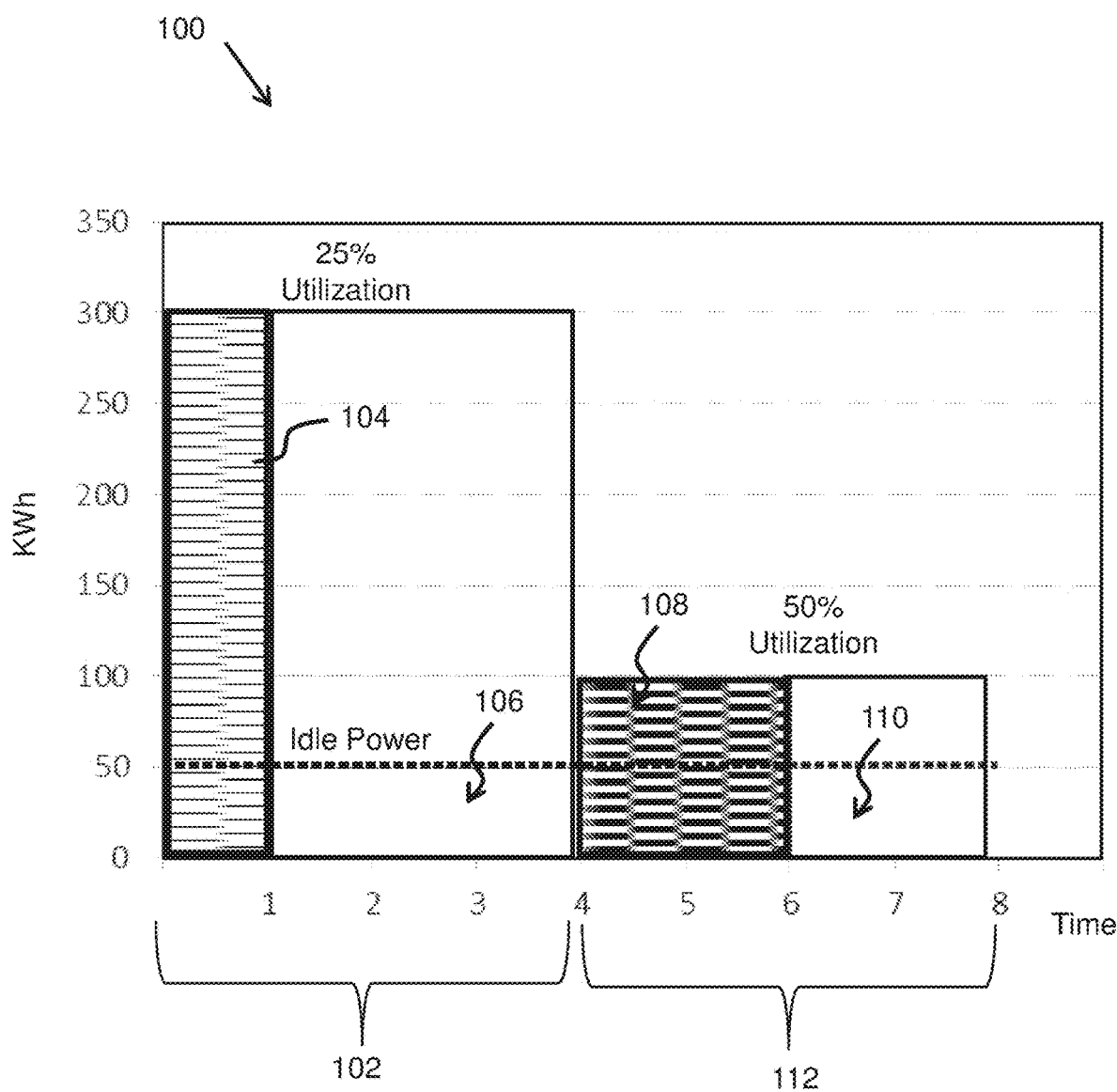
FIG. 1 is a graph of processor utilization rates versus time, in accordance with an embodiment of the present invention.

Embodiments of the present invention provide methods for improving power efficiency of a data center. Illustrative embodiments of the invention are described below. In the interest of clarity, not all features or components of an actual implementation are necessarily described. Embodiments and/or limitations featured in the figures are chosen for convenience or clarity of presentation and are not meant to limit the scope of the invention.

Hereinbelow, the term "power cap" refers to the maximum amount of power a server is allowed to draw (expressed in watts). The terms "utilization," "utilization rate," or "utilization level," refer to a ratio of time that a server is processing versus time that the server is "idle," waiting to process new tasks (typically measured in percent). The term "server" refers to a computer with one or more CPUs.

A server is assumed to have the ability to effectively balance loads, or tasks, between its CPUs, such that multiple CPUs of a server are assumed to operate at similar operating frequencies (i.e., clock speeds) and at similar utilization levels for any given period of time. Servers operate such that as the clock speed increases, the power required for processing grows exponentially while the performance (i.e., number of instructions executed per given time) grows linearly, effectively meaning that there are diminishing returns to increased speed. In addition, when a server is idle, performing no processes, it uses significantly less power than when processing, but significantly more than zero power.

Servers rarely operate at full utilization for prolonged periods of time. A typical utilization level for a data center server is 50%, meaning it is processing 50% of the time and idle 50% of the time. Given this situation, the server could do the same amount of processing if it were operating at 50% speed and at full utilization over the same period of time, which would dramatically reduce its power consumption, and thereby lower operating costs for the data center. Reduced power consumption for processing also reduces cooling system power consumption, especially as cooling must be maintained at relatively high levels to handle spikes, given that the cooling system cannot react instantaneously to processing spikes. Without sufficient cooling, servers are typically configured to automatically reduce their speed when heat builds up beyond a given temperature threshold.

While reducing server speed improves energy efficiency, servers must still be configured to meet performance levels defined by Service Level Agreements (SLAs), that is, data center commitments to customers for levels of speed and service). Consequently, a balance must be made between minimum processing times and power savings.

In one embodiment of the present invention, a power management system monitors a plurality of servers within a data center and defines the clock speed of each server's CPUs. The power management system can set each server to operate at a different speed, i.e., at a different performance level. The system is configured to set server power caps, which define caps, i.e., maximum levels of power consumption of a server. Servers typically implement their power caps by limiting their clock speeds and correspondingly limiting their operating voltages.

The power management system of the present invention may be configured to instruct servers to modify power caps according to utilization thresholds. If a server's utilization exceeds a utilization upper threshold, the system instructs the server to increase its power cap. If a server's utilization drops below a utilization lower threshold, the power cap is decreased.

When the power management system sets a new power cap for a server, the increment of the change between the prior power cap and the new power cap, that is, the power cap step size, may depend on several factors, including: the cooling capacity and the volatility of utilization.

If the cooling capacity is limited, large power cap steps would not achieve sufficient cooling, and the lack of sufficient cooling would result in throttling of performance. If the cooling capacity is larger, there will be sufficient cooling within a short response time, meaning that larger steps can be implemented when needed.

If the utilization level is not volatile, but is relatively stable, small incremental power cap steps may be sufficient to meet performance requirements. If the utilization is unstable, larger steps may be required to maintain performance goals.

Appropriate increments of power cap steps with respect to cooling capacity and volatility are typically determined during a period of data collection and of training a power management model for optimal operation. Such a model may be a rules-based model or a machine learning model. It should be noted that power management of single user devices, such as PCs or mobile devices, is less complex that power management of servers in a data center, as the PC or mobile devices have only one user, who can typically accept reduced performance for short periods when new applications are loaded. Additionally, single user devices do not compete for the tasks, nor is there spillover. When a single user device processes a request, it will either assign it immediately to a processor, or the task will wait until such a processor is available. By contrast, in a data center, if a server does not have sufficient capacity for a process the request can be redirected elsewhere. On the other hand, a data center has performance commitments to its users/customers, typically in the form of SLAs, meaning that the data center must achieve quantitative performance, availability, and/or response time goals to avoid financial penalties.

FIG. 1 is a graph 100 of processor utilization versus time, in accordance with an embodiment of the present invention. During four initial units of time 102 (for example, four minutes), a server is operating at a 300 W power cap and has 25% utilization, meaning that it is processing 25% of the time and idle 75% of the time. The processing time is indicated as a hatched area 104, from 0 to 1 time units, and the idle tie is indicated as area 106. There is a 50 W idle power draw (dashed line). While the processing time is indicated as occurring during the first minute, though this could be spread out as spikes, over the course of the four minutes. When processing, the power consumption is 300 W; when not processing the power consumption is 50 W. The total power consumption over the 4 units is therefore: 300+(3×50)=450 W·minutes. The average power during the 4 minutes is 450/4=112.5 W. The power consumption of 300 W reflects a given processing (i.e., clock) speed, which may be, for example, 3 GHz.

In this example that same amount of processing (i.e., the same number of instructions executed) could be accomplished over two time periods, by cutting the processing speed to half (i.e., for the given example, setting the speed to 1.5 GHz). Reducing the processing speed would reduce the voltage requirement, and therefore the power consumption. For example, for the given processor, the frequency reduction might reduce the power used during processing to 100 W from 300 W. Consequently, the frequency modification could also be achieved by setting the power cap at 100 W. This would mean that the utilization would be 50% for two units of time, e.g., minutes, indicated by a hatched area 108, from 4 to 6 time units. Then the server would be idle for two time periods, indicated as area 110. The total power consumed during the 4 time units (period 112) would be (2×100)+(2×50)=300 W·minutes, and the average power would be 75 W. Thus the reduced power cap reduces the average power consumption (over each respective 4 unit period) from 112.5 W to 75 W, creating a power savings of 33%. Additionally, the server would produce significantly less heat, thereby requiring less cooling resources and saving additional power.

In this example, the server could start with an operating power cap of 300 W and the power management system could track the utilization of the server for a period of 4 minutes, determining that the utilization is 25%. If a utilization lower threshold is set to 50%, meaning that the utilization is well below the lower threshold, the power cap could be reduced, as it was in this example to 100 W. The utilization would then be monitored (for example, for the next 4 minutes, but typically for shorter periods of time) and the power cap could again be changed as needed if the utilization changes. For example, the power cap could be further reduced if the utilization drops again, or the power cap could be increased if the utilization increases about a utilization upper threshold, such as 60%.

A server may also be set to have a minimum power cap, that is, a power cap below which the power cap is not reduced, as well as a maximum power cap, above which the power cap is not increased. By way of an additional example, a server may be set to have a utilization upper threshold of 80% and a utilization lower threshold of 55%, and to have power cap limits of 160 W and 300 W. The utilization may be measured once a minute and a moving average of 3 sample measurements may be used to determine average utilization. If the average utilization goes above the 80% upper threshold, the power cap may be increased by an increment of 40 W. For example, if the power cap was 200 W, it would be increased to 240 W. The power cap would continue to be increased after subsequent measurements if the utilization continued to exceed 80%, or until the maximum power cap of 300 W was reached. If the moving average utilization went below 55%, the power cap is reduced by 40 W, and this would similarly be repeated until the utilization exceeded 55% or until the minimal power cap (160 W) was reached.

In further embodiments, ways trying to bring the utilization to the 80% that will create minimum clock speed and maximum efficiency.

Figure 2:
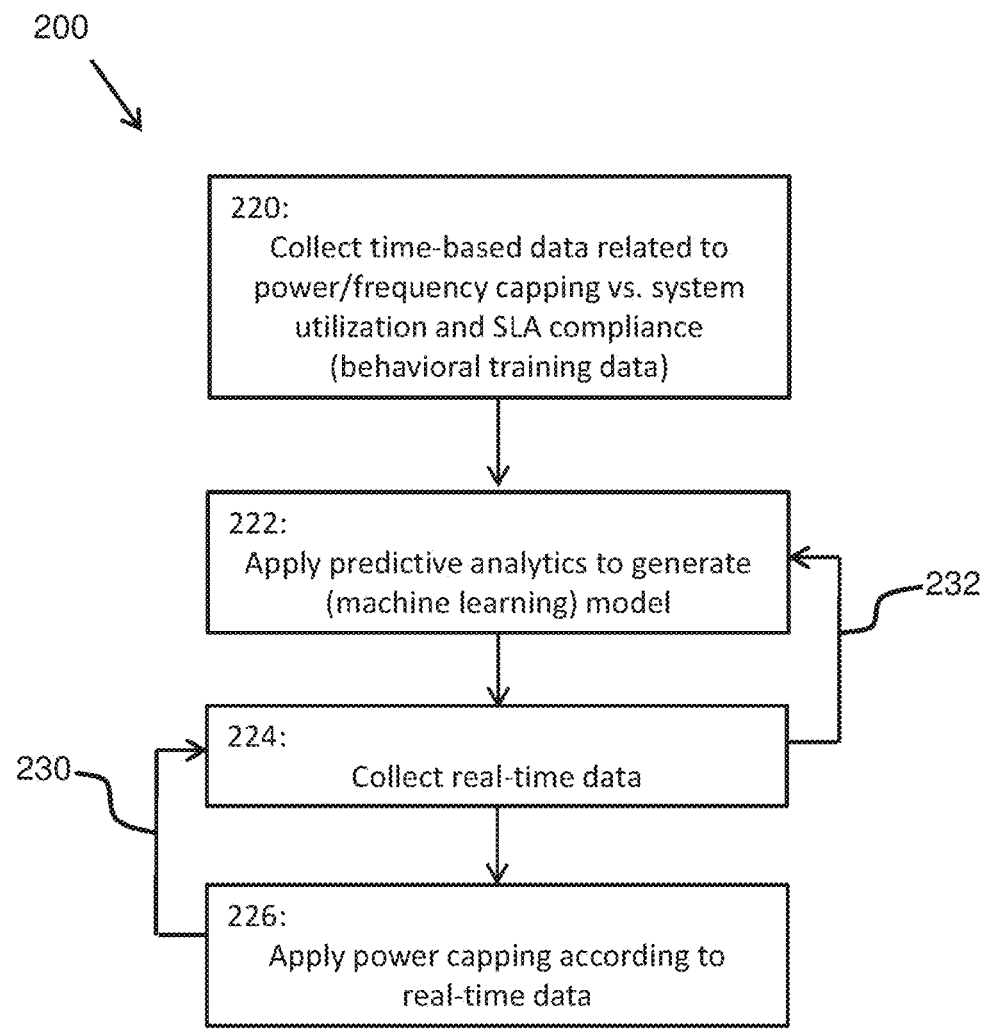
FIG. 2 is a flow diagram of a process for improving power efficiency of a data center, in accordance with an embodiment of the present invention.

FIG. 2 is a flow diagram of a process 200 for improving power efficiency of a data center, in accordance with an embodiment of the present invention. At a first step 220, "training" or "test" data" is collected, including operating parameters of one or more servers in a data center, referred to hereinbelow as the "target servers." Data is collected to determine the performance behavior of the target servers with respect to power capping and/or dynamic voltage frequency scaling (DVFS). The data collected typically includes several key types of time-based parameters, including: 1) the power consumption and/or utilization of the target servers; 2) the power capping or frequency thresholds imposed on the target servers; and 3) SLA metrics, particu-larly SLA metrics related to response times of the target servers. Temperature data, as well as temperature throttling data, may also be collected.

To collect these parameters, a wide range of commands may be issued, depending on the types of target servers being monitored. For Linux-based servers, commands such as turbostat, and data obtained from the /proc/stat and/proc/cpuinfo files may be used to obtain data regarding system utilization. Some of the parameters that can be extracted with the turbostat command include: CPU topology, frequency, idle power-state statistics, temperature, and power consumption.

For Intel®-based servers, the Intel tool, Running Average Power Limit (RAPL), may be applied to acquire power consumption data. Application of RAPL is described in: "RAPL in Action: Experiences in Using RAPL for Power Measurements," Khan, et al., in Trans. Model. Perform. Eval. Comput. Syst., Vol. 3, No. 2, Article 9, 2018, incorporated herein by reference. Additional Intel tools are also described at: "Intel® 64 and IA-32 Architectures Software Developer's Manual Volume 3B: System Programming Guide, Part 2, Chapter 14: Power and Thermal Management," incorporated herein by reference. Intel Data Center Manager (DCM) provides power and thermal management features that include monitoring and setting server operating frequency and power caps.

The PowerTOP Linux utility, developed by Intel, can monitor and display a server's electrical power usage. It is supported by Intel, AMD, ARM, and UltraSparc processors.

"Out-of-band" server management platforms, such as the Dell Remote Access Controller (DRAC) and the IBM Remote Supervisor Adapter, also include commands for collecting server parameters on power utilization. These platforms may make communicate with a baseboard management controller (BMC) of the target server, based on the Intelligent Platform Management Interface (IPMI) standard.

Two power consumption monitoring tools for Microsoft Windows are perfmon and powercfg. These provide data on power characteristics of a server. Additional monitoring tools are described in Gough, et al., "Energy Efficient Servers, Blueprints for Data Center Optimization," Apress, 2015, incorporated herein by reference.

As described above, several key types of data are collected over a period of time, to characterize the behavior of the target server under various loads and various operating thresholds. These key types of data include 1) the power consumption and/or utilization of the target servers; 2) the power capping or frequency thresholds imposed on the target servers; and 3) server performance, as measured by SLA metrics, particularly SLA metrics related to response times of the target servers. As noted above, temperature data, as well as temperature throttling data, may also be collected. The data collected may be organized as time-based vectors that indicate the values of the different parameters at given points of time. The time-based vectors also provide an indication of volatility of the parameters. During the course of data collection, power caps and operating frequencies of the target servers may also be adjusted by a range of increments, in order to measure how such changes in power caps and/or frequency affect the power consumption and the ability of the servers to meet SLA commitments.

After this data is collected over a period of time, for example over the course of a typical day, predictive analytics, which may include data correlation, may be applied at a step 222 to generate a model indicating optimal power caps that should be applied to the target servers for different measured utilization rates in order to reduce power consumption while meeting SLA metrics of compliance. Power caps may either be set by directly specifying the power cap for compliant CPUs, such as modern CPUs from Intel, or by specifying a maximum frequency threshold for CPUs that are designed to vary internal voltages according to specified operating frequencies. The power cap may also be set for some CPUs by directly specifying a maximum CPU voltage.

In general, determining appropriate power caps to improve power usage, for given utilization levels, involves setting a higher power cap if an upper utilization threshold is reached, and setting a lower power cap if a lower utilization threshold is reached, as described above with respect to FIG. 1. Using predictive analytics, optimal utilization thresholds are determined at which changes in power caps should be triggered. Optimal increments for changing the power caps may also be determined. That is, it may be determined that for a given set of target servers, power caps should be changed by increments of 5 W, at every 5% increment of utilization. Typically the model generated by predictive analytics would either a rules-based model with power cap and utilization increments changing depending on different ranges, and additional factors such as temperature and volatility. Alternatively, the model may be a machine learning model.

The determination of these threshold and increment values is based on the goal of reducing power consumption and is typically a function not only of utilization but of measured volatility of utilization over a given period of time, and may also be a function of server temperatures and of a cooling reaction capacity of a system. For example, if a system does not have sufficient cooling capacity to react quickly to a spike in processing power consumption, the power cap may not be increased by increments that allow sudden spikes. One measure of cooling capacity, for example, may be the rotations per minute (RPM) of cooling fans, a metric that may be provided by some operating systems and by DCM.

After a model is generated, at a step 224 real-time data is collected for the target service operation. The data, including system utilization data, as well as optional data such as temperature levels and metrics on SLA compliance, is then applied to the model generated at the step 222, to determine, at a step 226 a change to power capping. As described above, multiple mechanisms may be applied to set power capping. For example, to set a frequency limit, the Linux cpupower command could be applied, such as: cpupower frequency-set—max 2500 MH.

Controlling frequencies (i.e., CPU clock speed) using the Intel DCM (via API commands) is also possible, as is directly setting power caps in power or energy units (i.e., watts).

The process 200 has two iterative aspects. First, the process of collecting and applying real time data, respectively the steps 224 and 226, is iterative, as indicated by the feedback arrow 230. In addition, as new real-time data is collected at the step 224, this data may be applied to retrain the model of step 222, as indicated by the feedback arrow 232. Both iterative processes typically continue in parallel, throughout the course of system operation.

A front-end device or application implementing the above described method may be an add-on, or upgrade, or a retrofit to a commercial product for data center management. Processing elements of the system described herein may be implemented in digital electronic circuitry, or in computer hardware, firmware, software, or in combinations thereof. Such elements can be implemented as a computer program product, tangibly embodied in an information carrier, such as a non-transient, machine-readable storage device, for execution by, or to control the operation of, data processing apparatus, such as a programmable processor, computer, or deployed to be executed on multiple computers at one site or one or more across multiple sites. Memory storage for software and data may include multiple one or more memory units, including one or more types of storage media. Examples of storage media include, but are not limited to, magnetic media, optical media, and integrated circuits such as read-only memory devices (ROM) and random access memory (RAM). Network interface modules may control the sending and receiving of data packets over networks. Method steps associated with the system and process can be rearranged and/or one or more such steps can be omitted to achieve the same, or similar, results to those described herein.

It is to be understood that the embodiments described hereinabove are cited by way of example, and that the present invention is not limited to what has been particularly shown and described hereinabove.

What is claimed:

1. A computer-based system for improving power efficiency of a data center comprising one or more processors and a memory, the memory comprising instructions that when executed by the one or more processor cause the processor to implement steps of:
   acquiring, during a first operating period, training data including power caps, utilization rates, and a measure of Service Level Agreement (SLA) compliance of one or more computer servers of the data center;
   applying predictive analytics to the training data to create a model for determining power caps according to measured utilization rates of the one or more computer servers, wherein the determined power caps, when applied to the one or more computer servers, reduce power consumption and meet the measure of SLA compliance;
   applying the model, according to subsequent data received during a second operating period, to determine a power cap to apply to the one or more computer servers, wherein the subsequent data includes a subsequent utilization rate of the one or more computer servers; and
   applying the determined power cap to the one or more computer servers and reducing power consumption of the one or more computer servers according to the applied power cap,
   wherein determining the power cap comprises increasing the power cap by a power cap step size if the subsequent utilization rate exceeds an upper utilization threshold, wherein the power cap step size for increasing the power cap is a function of a cooling system reaction capacity.

2. The system of claim 1, wherein applying the power cap comprises setting a maximum CPU frequency.

3. The system of claim 1, wherein applying the power cap comprises setting a maximum CPU voltage.

4. The system of claim 1, wherein determining the power cap further comprises reducing the power cap to a lower power cap if the subsequent utilization rate reaches a lower utilization threshold.

5. The system of claim 1, wherein the power cap step size for increasing or decreasing the power cap is additionally a function of a volatility of utilization levels during one or both of the first operating period and the second operating period.

6. The system of claim 1, wherein the model is a machine learning model.

7. The system of claim 1, wherein the training data and the subsequent data include rotations per minute (RPM) of one or more fans of the one or more computer servers as a measure of the cooling system reaction capacity.

8. The system of claim 1, wherein the training data and the subsequent data include temperatures of one or more components of the one or more computer servers.

9. A method for improving power efficiency of a data center, the method implemented on one or more processors and a memory, the memory comprising instructions that when executed by the one or more processor cause the processor to implement the method, comprising:
   acquiring, during a first operating period, training data including power caps, utilization rates, and a measure of Service Level Agreement (SLA) compliance of one or more computer servers of the data center;
   applying predictive analytics to the training data to create a model for determining power caps according to measured utilization rates of the one or more computer servers, wherein the determined power caps, when applied to the one or more computer servers, reduce power consumption and meet the measure of SLA compliance;
   applying the model, according to subsequent data received during a second operating period, to determine a power cap to apply to the one or more computer servers, wherein the subsequent data includes a subsequent utilization rate of the one or more computer servers; and
   applying the determined power cap to the one or more computer servers and reducing power consumption of the one or more computer servers according to the applied power cap,
   wherein determining the power cap comprises increasing the power cap by a power cap step size if the subsequent utilization rate exceeds an upper utilization threshold, wherein the power cap step size for increasing the power cap is a function of a cooling system reaction capacity.

10. The method of claim 9 wherein applying the power cap comprises setting a maximum CPU frequency.

11. The method of claim 9, wherein applying the power cap comprises setting a maximum CPU voltage.

12. The method of claim 9, wherein determining the power cap further comprises reducing the power cap to a lower power cap if the subsequent utilization rate reaches a lower utilization threshold.

13. The method of claim 9, wherein the power cap step size for increasing or decreasing the power cap is additionally a function of a volatility of utilization levels during one or both of the first operating period and the second operating period.

14. The method of claim 9, wherein the model is a machine learning model.

15. The method of claim 9, wherein the training data and the subsequent data include rotations per minute (RPM) of one or more fans of the one or more computer servers as a measure of the cooling system reaction capacity.

16. The method of claim 9, wherein the training data and the subsequent data include temperatures of one or more components of the one or more computer servers.

* * * * *